United States Patent [19]

Liu

[11] Patent Number: 4,879,741
[45] Date of Patent: Nov. 7, 1989

[54] FAX/TELEPHONE SWITCHING DEVICE

[75] Inventor: Frank Liu, Taipei, Taiwan

[73] Assignee: Unisource Corp., Taiwan

[21] Appl. No.: 124,001

[22] Filed: Nov. 23, 1987

[51] Int. Cl.[4] ............................................. H04M 11/00
[52] U.S. Cl. ..................................................... 379/100
[58] Field of Search ................. 379/100; 358/280–284

[56] References Cited

U.S. PATENT DOCUMENTS

| | | | |
|---|---|---|---|
| 3,591,711 | 7/1971 | DeGroat | 379/100 |
| 4,562,483 | 12/1985 | Kurokawa et al. | 379/100 |
| 4,815,121 | 3/1989 | Yoshida | 379/100 |

Primary Examiner—Gerald Brigance
Assistant Examiner—Richard Hjerpe
Attorney, Agent, or Firm—Steinberg & Raskin

[57] ABSTRACT

A device used as a switching device between a telephone and a fax machine, especially for providing a general fax machine with a function of telephone connection including a calling circuit, a calling-detector circuit, a tone-detector circuit, a telephone-hold circuit and a telephone sounding circuit. Once a caller dials a fax number, the calling circuit and the tone-detector circuit start to detect the input signal. If the input signal is telephone-input, then the telephone-hold circuit holds the circut and a switch is triggered to make a telephone connection. Further, the telephone sounding circuit drives the buzzer of the telephone. Then the telephone switching is completed.

1 Claim, 2 Drawing Sheets

FAX/TELEPHONE SWITCHING DEVICE

BACKGROUND OF THE INVENTION

This invention relates to a fax/telephone switching device, especially to a device which utilizes a peripheral circuit loop of a fax machine to act as a telephone loop, so that a telephone set of the fax machine can also be used just like a normal telephone to communicate with another telephone.

Heretofore, many kinds of fax machines with an accessory telephonee set to dial the fax numbers of other facsimile stations have been developed in various parts of the world. Many conventional fax machines have an automatic-operation mode in which the fax machine has the so-called "auto-off hook function" (i.e., the fax machine can automatically change from on-hook state to off-hook state without picking up the hook) and a manual-operation mode in which there is no auto-off hook function and the fax machine can only become off-hook when the hook of the accessory telephone is taken up. Since a telephone only rings in its on-hook state, if the automatic-operation mode, the period of calling is transient and it is not long enough to attract the user's attention to pick up the hook. Therefore, the accessory telephone of the fax machine cannot be used as a normal telephone line during the transmission of fax data.

The switching device of this invention is created for providing a general fax machine with additional function—voice or sound communication; i.e., the switching means can identify whether or not the calling signal is a fax transmission or a voice communication. The switching device connects with a fax machine and a telephone and shares a peripheral circuit loop with the fax machine. When the fax machine receives a calling signal, a detector of the switching device detects if the calling signal is fax transmission or voice communications, then the switching device will switch the corresponding elements.

SUMMARY OF THE INVENTION

Therefore, the object of the fax/telephone switching device of this invention is to provide a general fax machine with telephone connection so as to enhance the functions of the fax machine and increase its economic efficiency.

Further objects and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
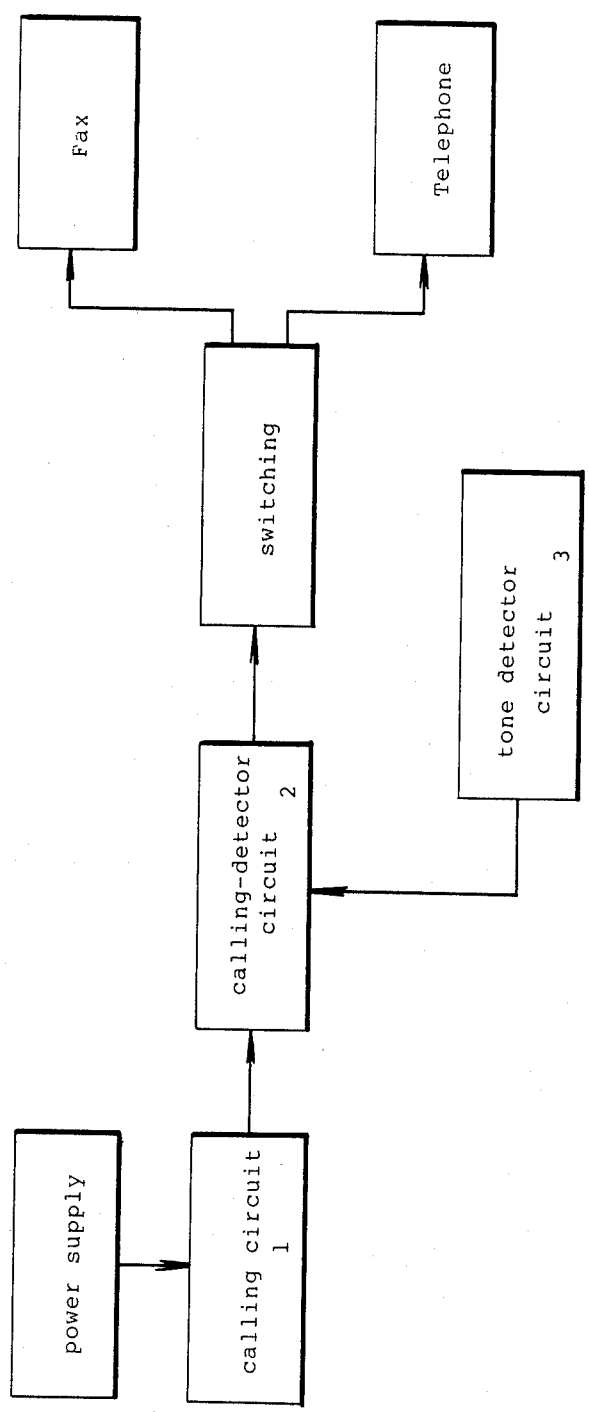
FIG. 1 is a block diagram of the circuit of the fax/telephone device of this invention.
Figure 2:
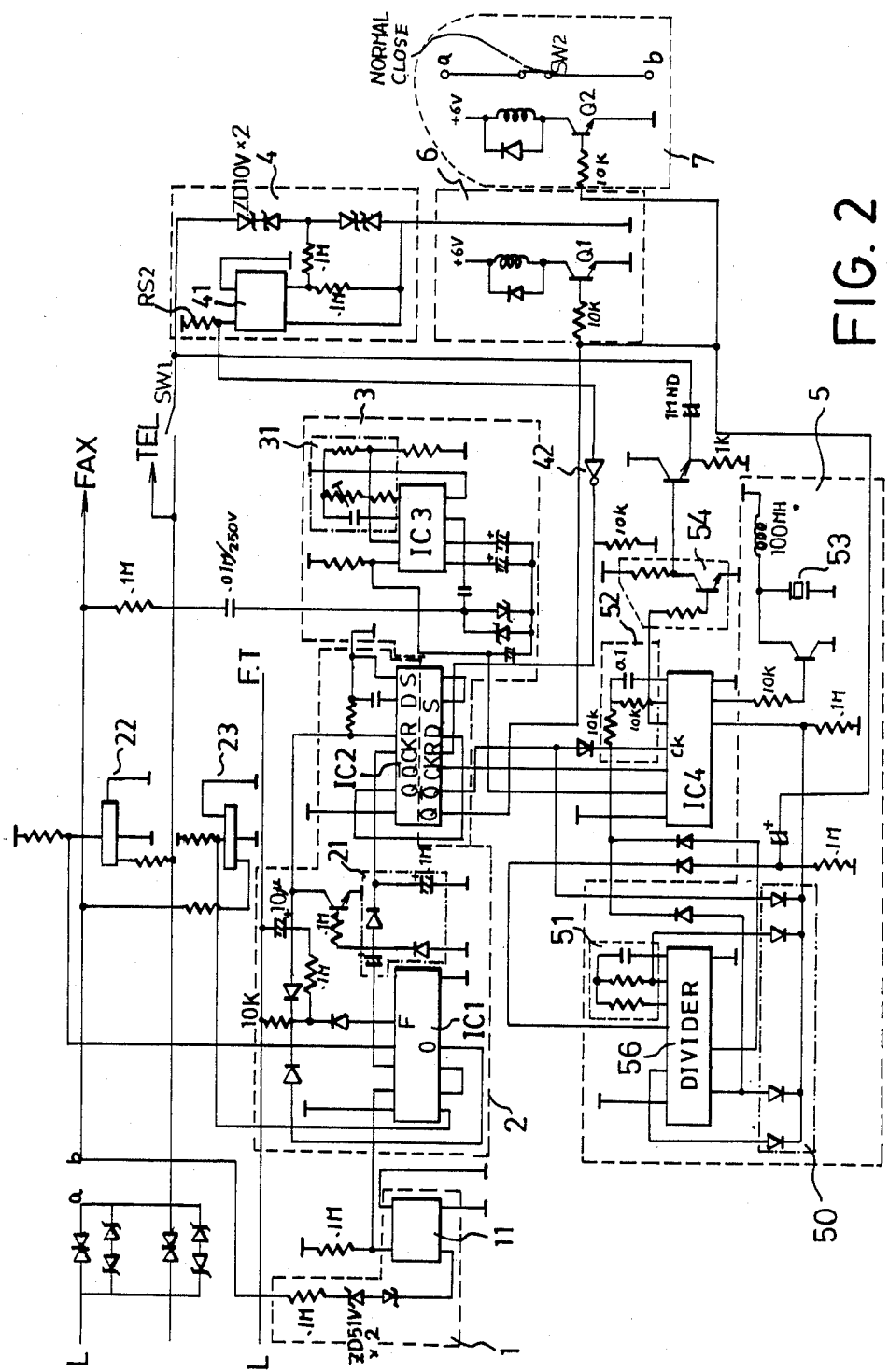
FIG. 2 is an electrical circuit of the fax/telephone switching device of this invention.

This invention discloses a fax/telephone switching device as shown in FIG. 1 and FIG. 2. The fax/telephone switching device for a fax machine principally comprises a calling circuit 1, a call-detection circuit 2, a tone-detector circuit 3, a telephone-hold circuit 4 and a telephone sounding circuit 5.

By referring to the block diagram of FIG. 1, the device of this invention is illustrated.

The electric power is supplied and rectified by a power source circuit. Firstly, when a call from a remote fax machine is transmitted to a local fax machine of this invention, after receiving the call, the local fax machine will send a 2100 HZ frequency signal to inquire of the remote fax machine whether the call is for fax transmission. If no signal is received by the local fax machine, then the local fax machine starts to transmit a 1850 HZ frequency which means that the local fax machine verifies the call to be voice communication.

After the local fax machine receives the call, the calling circuit 1 first outputs a calling signal and the calling signal is coupled to the call-detection circuit 2 via a photo-coupler 11. Simultaneously, the tone-detector circuit 3 detects if the calling signal is fax transmission of voice communication by identifing if a 1850 HZ frequency is sent by the local fax machine. If the calling signal is voice communication, then the circuit will produce the following results:

(1) a buzzer oscillator 51 oscillates and drives the buzzer 53 of the telephone to activate;

(2) a blind-tone oscillator 52 oscillates and drives a blind tone for notifying the telephone-caller to wait; and (3) the telephone-hold circuit 4 is conductive to hold the telephone until the telephone is picked up.

The above operations continue until the telephone handset is taken up; then, a voice communication starts. It the local fax machine receives a signal from the remote fax machine after transmitting the 2100 HZ frequency signal (i.e., verifying the call is for fax transmission, then a light-coupled element 23 connected with the local fax machine will light up and transmit a LOW-level signal to the call-detection circuit 2 to disenable the oscillators 51, 52. In this state, the circuit for voice communication of OFF and the fax transmission is executed in the local fax machine.

Now referring to FIG. 2, a detailed description of the electrical circuit of this invention is presented as follows:

The calling circuit 1 comprises two serial Zener diodes and a photo-coupler 11. Once the calling circuit 1 is conducted, the photo-coupler 11 is conducted and coupled with a HIGH-level signal to the call-detection circuit 2. The call-detection circuit 2 comprises an inverted IC1 (integrated circuit 1), a charged circuit 21 and a first D-type flip-flop. The inverted IC1 may include six inverters therein. Therefore, the HIGH-level signal from the photo-coupler 11 is input to the inverted IC1 and converted to a LOW-level output. After charging via the the charged circuit 21. the LOW-level signal is input to the D-type flip-flop.

The tone detector circuit 3 includes a tone-detector IC3 which is connected with an RC circuit 31. Please note that the RC circuit 31 presets the frequency to a constant frequency (for example, 1850 Hz), which acts as a reference frequency stored in the tone-detector IC3 for comparing with the frequency of the signal sent from the local fax machine. As described in the preamble, after receiving the call, the local fax machine will send a signal with a frequency of 1850 HZ to the tone-detector IC3 if it does not receive any response for fax transmission from the remote fax machine.

Therefore, once the tone-detector IC3 detects a frequency (in this case approximately 1850 HZ), the tone-detector IC3 will output a LOW-level signal to a second inverted IC4. Note that the tone-detector circuit 3 further comprises a second D-type flip-flop. The D-type flip-flop of the tone-detector circuit 3 and that of the call-detection circuit 2 also can be interchanged with IC2 as shown in the figure which comprises two sets of D-type flip-flops, wherein the lower set of the IC2 (equivalent to that of the tone detector circuit 3) is connected to second inverted IC4. Simultaneously the second inverted IC4 converts the LOW-level signal received from the tone-detector IC3 to HIGH-level and outputs the converted HIGH-level signal to the CK pin of the lower D-type flip-flop.

By referring to the above-mentioned description and FIG. 2, it can be seen that the output (HIGH-level after converted by the first inverted IC1) of the upper D-type flip-flop is input into the lower set of D-type flip-flop, so as to make the output $\overline{Q}$ HIGH and $\overline{Q}$ LOW. If the lower D-type flip-flop does not receive any clock pulse, then the output $\overline{Q}$ will keep HIGH and disenable the second oscillator 52. Simultaneously, the first oscillator 51 connected to the output of the second inverted IC4 is also disenabled if the second inverted IC4 receives a HIGH-level pulse. As can be seen in FIG. 2, the first oscillator 51 is electrically connected to a counter/divider 56, the outputs of which are connected to a plurality of inverters 50 via the second oscillator 52 and the second inverted IC4 to actuate the buzzer 53.

Now since the tone-detector circuit 3 detects the input signal to be voice communication and transmits a LOW-level signal to the input of the second inverted IC4, then a pulse (HIGH-level) is output to the CK pin of the lower D-type flip-flop of the IC2, so that the output $\overline{Q}$ of the lower D-type flip-flop is changed to a LOW-level signal. As a result, the oscillators 51 start to oscillate and drive the buzzer 53 of the telephone and a blind-tone driver 54 to notify the dialing-in user to wait, respectively.

Simultaneously, the output Q of the lower D-type of the IC2 will transmit a HIGH-level signal to a first switch control circuit 6. The switch control circuit 6 comprises a transistor Q1 which controls a first switch SW1 of the telephone-hold circuit. When the HIGH-level signal output from the pin Q is input to the switch control circuit 6, the transistor Q1 will be turned ON so as to trigger the switch SW1 to close, such that the telephone-hold circuit 4 is conductive. Therefore, a photo-coupler 41 conducts.

Note that the telephone-hold circuit 4 is connected to the RESET pin of the lower D-typed flip-flop of the IC2 via a second photoresistor RS2. A HIGH-level signal (coupled from the photo-coupler 41) from the photoresistor RS2 is converted to a LOW-level signal via an inverter 42 and transmitted to the RESET pin of the lower D-typed flip-flop of IC2., so that the IC2 does not operate. Additionally, another output (0 point) of the second inverted IC4 also transmits a HIGH-level signal to a second control switch circuit 7 which controls a second normal ON switch SW2 between the power source and the fax machine. Therefore, the normally closed switch SW2 is triggered to be opened; that is, the fax/telephone switching device is switched to the telephone line. When the telephone handset is taken up, the photo-couple 41 of the telephone-hold circuit 4 stops conducting so that the photoresistor RS2 will transmit a LOW-level signal which is converted to HIGH-level signal via the inverter 42 and transmitted to the RESET pin so as to reset the lower D-typed flip-flop of IC2. Therefore, the output $\overline{Q}$ is again converted to a HIGH-level signal; that is, the oscillators 51 and 52 are disenabled again. Then, the voice communication starts.

If the input signal is for fax transmission, then the oscillators 51, 52 and the telephone-hold circuit 3 will be non-operated and the normal ON switch remains closed. Therefore, the input signal will be transmitted to the fax machine. Note that the fax-line and telephone-line are each connected with a respective second and third photo-coupling device 22 and 23. The two photo-coupling devices 22 and 23 are also connected to the INPUT pins of the first inverted IC1. Especially, the photo-coupling device 23 of the telephone-line can be converted by the first inverted IC1 and transmitted to a RESET pin of the upper D-typed flip-flop of IC2. When the input data is transmitted by a fax-line, the LED of the photo-coupling 22 conducts and transmits a HIGH-level signal to the first inverted IC1. In contrast, the LED of the photo-coupling 23 does not conduct, thereby transmitting a LOW-level signal. Such LOW-level signal is converted to HIGH and transmitted to the RESET pin of the upper D-typed flip-flop of IC2; therefore, IC2 is disenabled and the oscillators 51, 52 are non-operative.

According to the above description, it is obvious that the fax/telephone switching device of this invention provides a general fax machine with optional functions; i.e., the fax machine which is useful for voice communication. Therefore, the economic efficiency of a conventional fax machine can be increased. While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A fax/telephone switching device for a fax machine comprising a calling circuit (1), a call-detection circuit (2), a tone-detector circuit (3), a telephone-hold circuit (4), a telephone sounding circuit (5), a first switch control circuit (6) having a first switch for voice communication, and a second switch control circuit (7) having a second switch for fax transmission;

said calling circuit (1) comprising a photo-coupler (11) electrically connected to said call-detection circuit (2);

said calling circuit actuated by an input signal which is rectified by a power source circuit;

said photo-coupler (11) sending a high-level signal to said call-detection circuit (2);

said call-detection circuit (2) comprising a plurality of inverters, a charged circuit (21) and a first D-type flip-flop;

said signal from said photo-coupler (11) being converted to a low-level signal by said inverter, and inputting said low-level signal into said D-type flip-flop after being charged by said charged circuit (21);

said tone-detector circuit (3) including a tone-detector integrated circuit, an RC circuit (31) and a second D-type flip-flop connected to said tone-detector integrated circuit; an output of said first D-type flip-flop being connected to an input of said second D-type flip-flop;

said RC circuit (31) producing a constant frequency signal;

said tone-detector integrated circuit connected to said RC circuit (31) and storing said constant frequency signal as a reference frequency for comparing with said input signal;

said second D-type flip-flop connected to a second inverted integrated circuit and first switch control circuit (6);

said second inverted integrated circuit connected to said second switch control circuit (7);

said tone-detector integrated circuit sending a low-level signal to said second inverted integrated circuit when said tone-detector integrated circuit detects that said input signal has a frequency equal to said reference frequency;

said second inverted integrated circuit converting said low-level signal to a high-level signal and sending said high-level signal to said second D-type flip-flop;

said seciond D-type flip flop sending a high-level signal to said first switch control circuit (6) to set said first switch on;

said second inverted integrated circuit sending a low-level signal to said second switch control circuit (7) to set said second switch off;

said telephone-hold circuit (4) being connected to and controlled by said second D-type flip-flop of said tone-detector circuit (3);

said telephone sounding circuit (5) comprising a blind-tone oscillator (52), a buzzer oscillator (51), a divider (56) and a buzzer (53);

an input of said blind-tone oscillator (52) being connected to an output of said second D-type flip-flop;

an input of said buzzer oscillator (51) being connected to an output of said second inverted integrated circuit;

said second D-type flip-flop enabling said blind-tone oscillator (52) when said second D-type flip-flop receives said high-level signal from said second inverted integrated circuit, and said blind-tone oscillator (52) producing a blind-tone to notify a telephone-caller to wait;

said second inverted integrated circuit enabling said buzzer oscillator (51) to actuate said divider (56) to drive said buzzer (53) when said second inverted integrated circuit receives said low-level signal from said tone-detector integrated circuit;

second and third photo-coupling devices (22), (23) connected to said power source circuit and actuated by said input signal;

said photo-coupling devices (22), (23) connected to inputs of said calling circuit (1);

said third photo-coupling device (23) connected to a reset pin of said first D-type flip-flop;

when said input signal being for fax transmission, said second photo-coupling device (22) being actuated; and said third photo-coupling device (23) being actuated so as to enable said first D-type flip-flop and to actuate said buzzer oscillator (51) and said blind-tone oscillator (52) when said input signal being for voice transmission.

* * * * *